US012257836B2

(12) United States Patent
Rolland et al.

(10) Patent No.: US 12,257,836 B2
(45) Date of Patent: Mar. 25, 2025

(54) METHOD FOR PRINTING A PLURALITY OF DROPS AT HIGH SPEED

(71) Applicant: DOVER EUROPE SÀRL, Vernier (CH)

(72) Inventors: Jean-Marie Rolland, Romans (FR); Bénédicte Bertolami, Saint Marcel les Valence (FR); Gabriel Leopold, Malissard (FR)

(73) Assignee: DOVER EUROPE SÀRL, Vernier (CH)

( * ) Notice: Subject to any disclaimer, the term of this patent is extended or adjusted under 35 U.S.C. 154(b) by 496 days.

(21) Appl. No.: 17/495,129

(22) Filed: Oct. 6, 2021

(65) Prior Publication Data

US 2022/0111643 A1 Apr. 14, 2022

(30) Foreign Application Priority Data

Oct. 9, 2020 (EP) .................................... 20306193

(51) Int. Cl.
*B41J 2/12* (2006.01)
*B41J 2/08* (2006.01)
*B41J 3/407* (2006.01)

(52) U.S. Cl.
CPC . *B41J 2/12* (2013.01); *B41J 2/08* (2013.01); *B41J 3/4073* (2013.01)

(58) Field of Classification Search
CPC ............... B41J 2/12; B41J 2/08; B41J 3/4073
See application file for complete search history.

(56) References Cited

U.S. PATENT DOCUMENTS 4,015,267 A * 3/1977 Kasubuchi ................. B41J 2/12 347/79
4,435,720 A 3/1984 Horike et al.
4,438,440 A 3/1984 Jinnai et al.
6,247,800 B1 * 6/2001 Mutoh ....................... B41J 2/09 347/74
2010/0073411 A1 * 3/2010 Moriai ....................... B41J 2/09 347/55
2011/0157610 A1 * 6/2011 Araszkiewiez ............ B41J 2/12 358/1.8

(Continued)

FOREIGN PATENT DOCUMENTS

JP S5789974 A 6/1982
JP S57191069 A 11/1982

OTHER PUBLICATIONS

European Search Report for EP application No. 20 30 6193 dated Feb. 26, 2021.

*Primary Examiner* — Yaovi M Ameh
(74) *Attorney, Agent, or Firm* — McDonald Hopkins LLC

(57) ABSTRACT

A method for forming at least one plurality of printed dots on a surface, with help of at least one plurality of drops generated by a printhead of a continuous inkjet printer. The method comprises, for each plurality of printed dots: deciding, whether all drops of the at least one plurality of drops are protected from perturbations due to the air resistance or whether at least one drop of the at least one plurality of drops is not protected from the perturbations; generating and charging each drop of the at least one plurality of drops according to whether it is protected from the perturbations or not protected from the perturbations; and printing the at least one plurality of drops on the surface.

16 Claims, 8 Drawing Sheets

(56) References Cited

U.S. PATENT DOCUMENTS

| | | | | |
|---|---|---|---|---|
| 2014/0378585 | A1* | 12/2014 | Li | C09D 11/328 524/90 |
| 2018/0333307 | A1* | 11/2018 | Hudson | A61F 13/15577 |
| 2019/0389222 | A1 | 12/2019 | Bonneton et al. | |

* cited by examiner

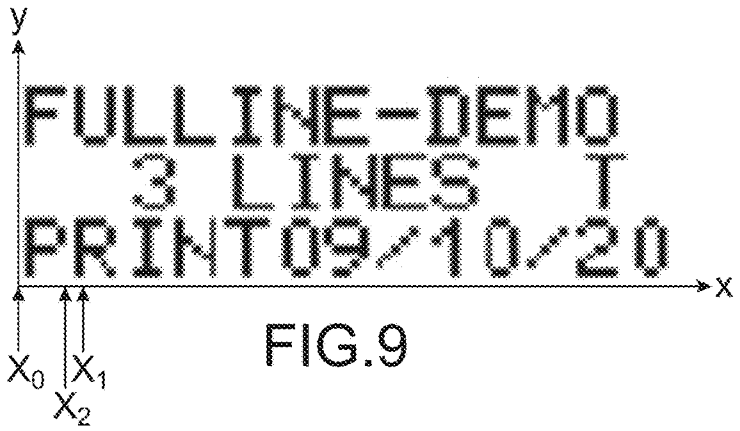
FIG.9
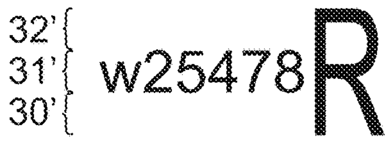
FIG.10
FIG.11A
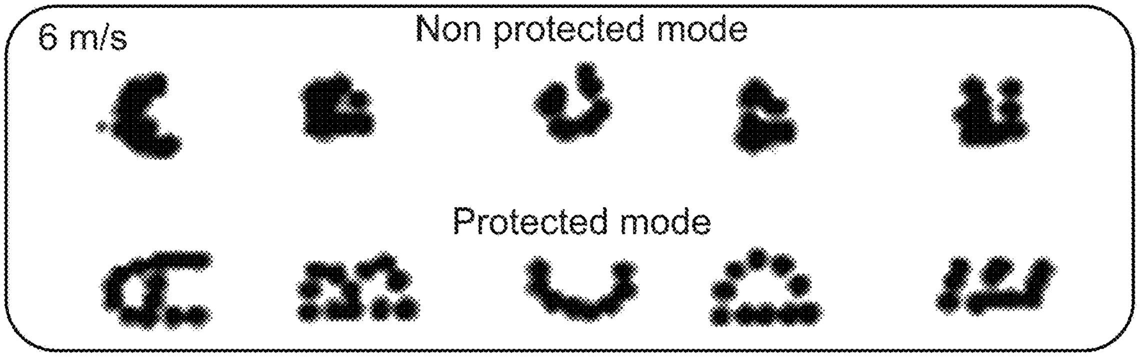
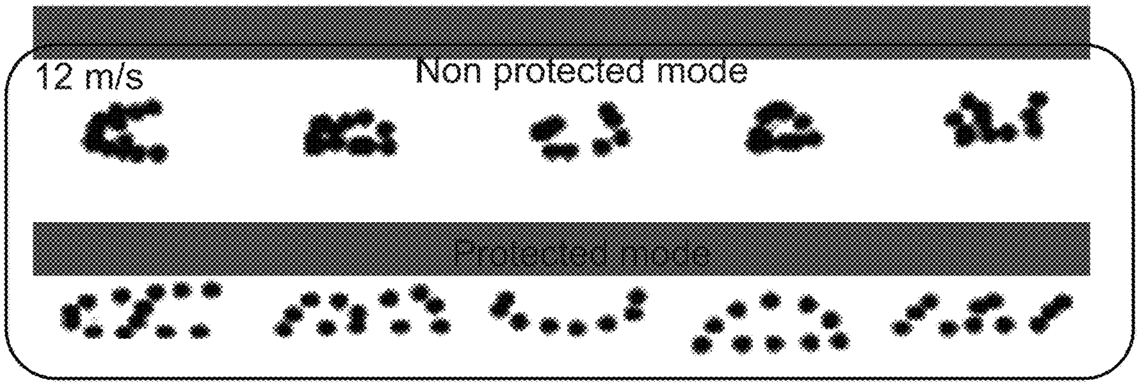
FIG.11B

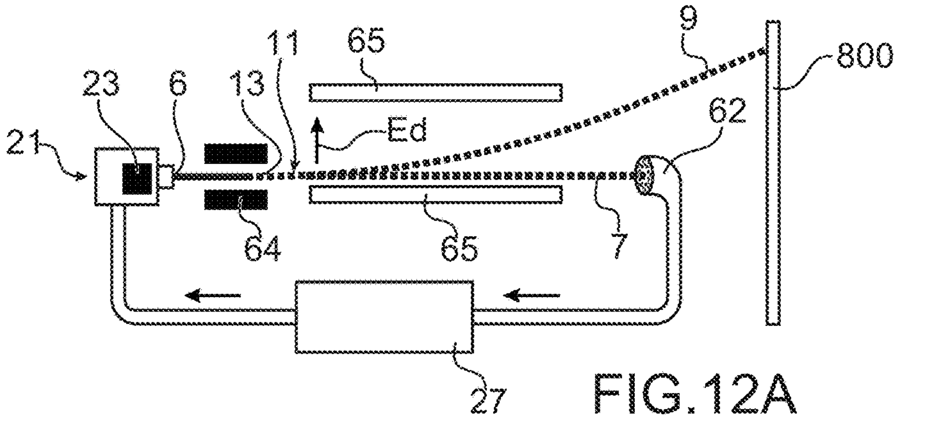
FIG.12A
FIG.12B
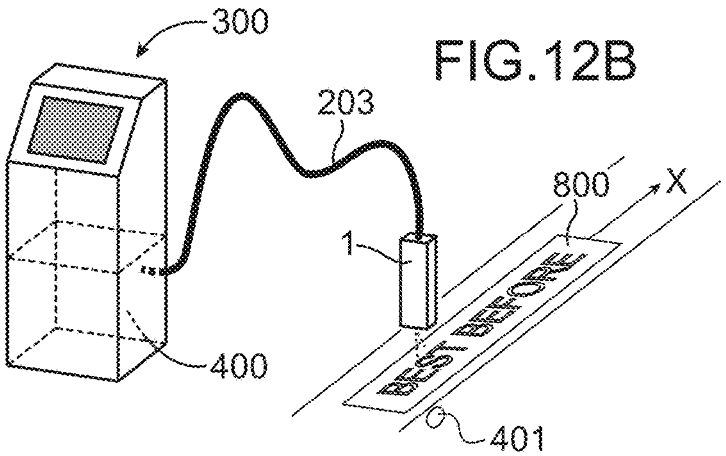
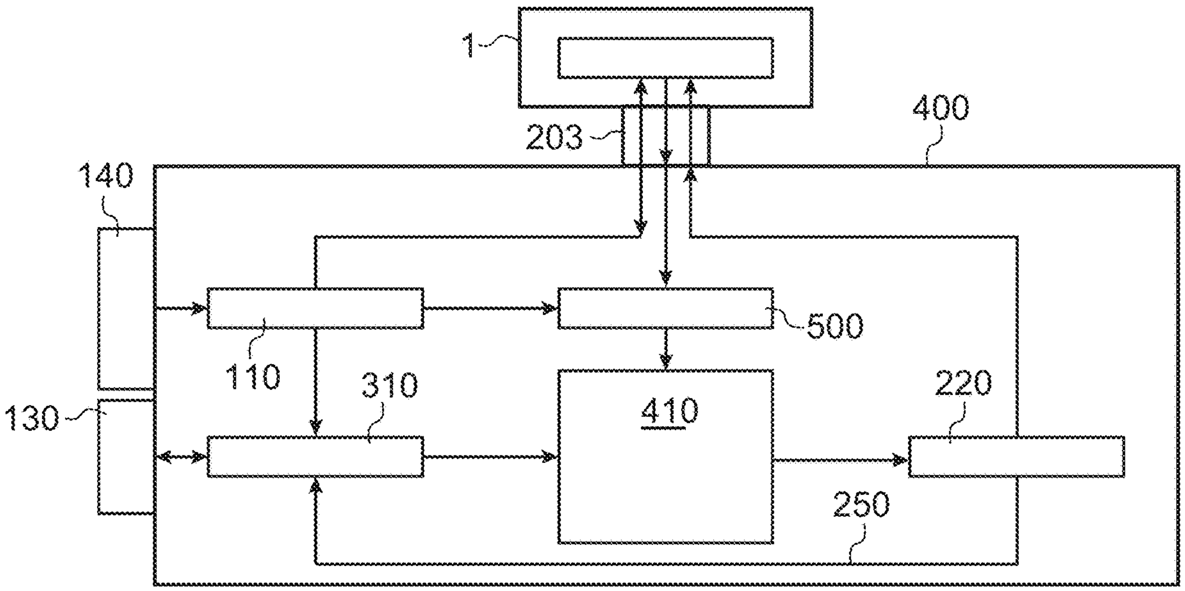
FIG.13

METHOD FOR PRINTING A PLURALITY OF DROPS AT HIGH SPEED

CROSS-REFERENCE TO RELATED APPLICATIONS

This application claims priority from European Patent Application No. 20306193.2 filed on Oct. 9, 2020. The content of this application is incorporated herein by reference in its entirety.

TECHNICAL FIELD AND PRIOR ART

This invention concerns a method and a printer for printing drops, in particular at high speed.

Continuous Ink Jet ("CIJ") printers is implemented in particular for printing characters (letters, and/or figures and/or symbols) on surfaces, in particular on surfaces which are not flat, for example cables or bottles or cans.

The usual printing mode of a CIJ printer is a dot matrix mode, as illustrated on FIGS. 1A and 1B, in order to print characters like the one illustrated on FIG. 2. FIG. 1A shows a succession of drops generated by the generator of the printer for printing the column of dots (or printed drops) of FIG. 1B which is the first or the last column of the character represented on FIG. 2: said drops of FIG. 1A are flying towards the support on which the character must be printed. FIG. 2 shows that the printed character is made of successive printed columns 2, separated by a predetermined distance d, each column comprising a number of printed drops, each printed drop being located at a particular pixel. In the dot matrix mode, each column is processed and printed one after another and independently of each other, one column being printed each time the support moves the predetermined distance or pitch d (which approximately correspond to the distance between the middle of two neighboring columns of the printed character of FIG. 2: the printing substrate travels in direction X and its position relative to the print head is detected by a detector, or means detecting the travel distance, said detector or means emitting a position signal at each pitch d. This signal is received by the controller of the printer and the emission of a group of drops for printing a column can be synchronized with each displacement of the substrate over the distance d.

The group of drops for each column comprises as many drops as there are possible dots in the column, some of said drops being for printing, some possibly not being printed, and the group of drops further comprising guard drops.

Any drop generator, in particular those implementing piezo-electric devices, works at a fixed frequency. The drops are thus generated at a constant rate. The number of drops generated at slow speed is sufficient to print the characters in dot-matrix mode but, when the printing speed increases (which is in particular the case for products which are extruded, like cables or pipes or tubes or ducts), the number of drops generated is insufficient.

However, aerodynamic perturbations (aerodynamic interactions between drops and with their environment) interfere with the drops trajectories and affect at least the first printed character: the first drops of the first character is slowed down by such perturbations; as a result, the first printed character is skewed.

Aerodynamic perturbations may also affect other printed character, or other bursts or groups or succession of drops, which are not enough protected by preceding drops. Again, this may result in printed characters which are skewed.

The problem is even worse when printing on surfaces which are not flat, for example cables or bottles or cans or extruded products like ducts or tubes or pipes or ducts, because different drops will have different flight times due to the curvature or the bend of the product.

The problem is even worse when printing at high speeds, for example at a speed of 5 to 10 m/s or higher than 10 m/s or higher than 17 m/s.

A problem is to improve the print quality of all characters (letters, figures etc), in particular at high speed.

SUMMARY OF THE INVENTION

The invention provides a first method for forming at least one plurality of printed dots on a surface, with help of at least one plurality of drops generated by a printhead of a continuous inkjet printer, said method comprising, for each character:

a)—deciding whether all drops of said at least one plurality of drops are protected from perturbations due to the air resistance or whether at least one drop of said at least one plurality of drops is not protected from said perturbations;

b)—charging each drop according to whether it is protected from said perturbations or not protected from said perturbations;

c) printing the drops.

In particular, the invention provides a method for forming at least one plurality of printed dots on a surface, with help of at least one plurality of drops generated by a printhead of a continuous inkjet printer, said method comprising, for each character:

a)—deciding whether all drops of said at least one plurality of drops are protected from perturbations due to the air resistance or whether at least one drop of said at least one plurality of drops is not protected from said perturbations;

b)—for each drop of said at least one plurality of drops, selecting charge data from at least a first set of data or database (DB1) of charge data for drops protected from said perturbations or from at least a second set of data or database (DB2) of charge data for drops not protected from said perturbations, depending on the result of step a);

c)—generating and charging the drops of said at least one plurality of drops, according to the charges selected from said at least first set of data or database (DB1) or from said at least second set of data or database (DB2);

d)—printing said at least one plurality of drops on said surface, thus forming said character.

The charge data can be selected from said at least first set of data or database (DB1) of charge data or said at least second set of data or database (DB2) of charge data for each drop, one by one. Alternatively, the charge data can be selected from said at least first set of data or database (DB1) of charge data or said at least second set of data or database (DB2) of charge data for a plurality of drops which are to be printed (or printable drops) to form:

- a plurality of dots, or all the dots, of a same column (perpendicular to the direction of travel of the substrate) which form for example part of a character or of a message;
- a plurality of dots, for example all the dots, of several columns (each column being perpendicular to the direction of travel of the substrate), said several columns forming for example a whole character or a whole message.

In a method according to the invention, each plurality of drops can be for forming part of a character or a whole character (in particular in a "character mode" as defined below).

In a method according to the invention, said step of deciding whether all drops of said at least one plurality of drops are protected from perturbations due to the air resistance or whether at least one drop of said at least one plurality of drops is not protected from said perturbations can be based on whether said at least one plurality of drops is preceded by at least another printable drop (or drop to be printed), so-called preceding drop to be printed or printable drop or preceding plurality of drops to be printed or printable drops.

In particular, said step of deciding whether all drops of said at least one plurality of drops are protected from perturbations due to the air resistance or whether at least one drop of said at least one plurality of drops is not protected from said perturbations can be based:

- if said at least one plurality of drops is preceded by only one preceding drop to be printed or printable drop, on the duration, or on the number of non-printable drops, between the generation of said one preceding printable drop and the generation of the first drop of said at least one plurality of drops.
- if said at least one plurality of drops is preceded by a plurality of drop to be printed or printable drops:
- on the number of said preceding plurality of drop to be printed or printable drop:
- and on the duration, or on the number of non-printable drops which are not for printing or which are not printable, between the generation of the last one of said preceding plurality of drops to be printed or printable drops and the generation of the first drop of said at least one plurality of drops.

In both cases, said step of deciding can be based on:

- the comparison of the number of preceding plurality of drops to be printed or printable drops with a minimum number of drops to be printed to be printed or printable drops, said minimum number being considered to be sufficient to protect the drops of said at least one plurality of drops,
- and/or the comparison of said duration, or of said number of non-printed drops, between the generation of the preceding drops to be printed or of the last one of preceding plurality of drops to be printed and the generation of the first drop of said at least one plurality of drops, with a maximum duration, or a maximum number of non-printed drops, beyond which there is no protection by the preceding drop to be printed or by the preceding plurality of drops to be printed.

Charge data can be selected from a plurality of first sets of data, each set of data being associated with one charge range and/or from a plurality of second sets of data, each set of data being associated with one charge range.

In particular, the charge data are preferably selected from among:

- a plurality of first sets of data, each of said first sets of data comprising charge data within a certain range of charge or of voltages, for drops protected from said perturbations; for example a first set of data comprises charge data within a first range $V_{1-}$-$V_{1+}$, and at least a second set of data comprises charge data within a first range $V_{2-}$-$V_{2+}$ ($V_{1+}<V_{2-}$); more generally, the charge data for drops protected from said perturbations can be selected from among a number N of sets of data, each set of data i (1≤i≤N) comprising charge data within a range $V_{i-}$-$V_{i+}$, the set of data i+1 comprising charge data within a range $V_{(i+1)-}$-$V_{(i+1)+}$, with $V_{i+}<V_{(i+1)-}$;
- and/or a plurality of second sets of data, each of said second sets of data comprising charge data within a certain range of charge or of voltages, for drops not protected from said perturbations; for example a first set of data comprises charge data within a first range $V'_{1-}$-$V'_{1+}$, and at least a second set of data comprises charge data within a first range $V'_{2-}$-$V'_{2+}$ ($V'_{1+}<V'_{2-}$); more generally, the charge data for drops not protected from said perturbations can be selected from among a number N' of sets of data, each set of data i (1≤i≤N') comprising charge data within a range $V'_{i-}$-$V'_{i+}$, the set of data i+1 comprising charge data within a range $V'_{(i+1)-}$-$V'_{(i+1)+}$, with $V'_{i+}<V'_{(i+1)}$.

These different sets of data for different charge ranges are adapted to print drops in different distance ranges, with respect to a fixed reference, for example with respect to the trajectory of non-deflected drops or with respect to the gutter, the charge data for printing a same character or group of dots not being the same depending on its distance with respect to a fixed reference, for example the trajectory of non-deflected drops or with respect to the gutter.

Each of said sets of data preferably forms a database.

In a particular embodiment of the invention, said plurality of printed dots can form several printed lines, for example parallel with each other and located at different distances from the trajectory of non-deflected drops or with respect to the gutter, different lines being printed with different charge ranges. In such a case, charge data can be advantageously selected from a plurality of first sets of data, each set of data being associated with one charge range and/or from a plurality of second sets of data, each set of data being associated with one charge range.

A method according to the invention is particularly well adapted for printing on a surface having a curvature, for example the surface of a cable or a bottle or a can or of a duct or a tube or a pipe and/or on a surface having a speed higher than 1 m/s or higher than 5 m/s or higher than 15 m/s or 17 m/s with respect to the continuous inkjet printer.

If a surface which must be printed has a varying speed, with respect to the continuous inkjet printer, for example a speed varying from a slow speed of less than 5 m/s to a high speed, higher than 5 m/s or higher than 10 m/s or higher than 15 m/s or 17 m/s, printing can be first made, at slow speed, in dot matrix mode and then, at higher speed, according to a different mode, in particular the so-called "character mode" described in this application.

The invention also provides a second method, also called the printing "character mode", for printing on a surface a group of pixels or of dots which are aligned along different columns between a first printed column and a last printed column, comprising:

a)—generating a group of drops for printing said group of pixels or of dots by a print head of a continuous inkjet printer, the first drop of said group of drops being the first printable drop, or drop to be printed, of the first column, the last drop of said group of drops being the last printable drop, or drop to be printed, of the last column;

b)—charging all of said drops, from said first drop of said group of drops to the last drop of said group of drops;

c) printing the drops.

Said group of pixels or of dots which are not aligned along a same column can form a character, for example a letter or a figure.

A group of pixels or of dots which are not aligned along a same column can be formed each time the surface travels over a certain predetermined distance with respect to said print head.

Said second method may implement the above described first method according to the invention.

In said character mode, one or more dots of a column of dots can be printed before all dots of the preceding column are printed. For example, it is possible to start printing at least one column i of said different columns between said first column and said last column before ending the printing of the preceding column i-1. This allows flexibility in order to minimize the electrostatic interactions between the drops which are used to print said preceding column and which have the highest charges In a embodiment of the first method according to the invention:

- the plurality of drops can be charged and printed according to a dot matrix mode;
- or the plurality of drops can be charged and printed according to a character mode as defined above.

The invention also concerns a continuous inkjet printer comprising:

- means for forming a plurality of ink drops from a continuous jet of ink;
- means for, or means programmed for, deciding, for each drop of said plurality of drops, whether it is protected or not from perturbations due to the air resistance;
- means for charging each drop according to whether it is protected from said perturbations or not protected from said perturbations.

In particular, the invention also concerns a continuous inkjet printer comprising:

- means for forming a plurality of ink drops from a continuous jet of ink;
- means for, or means programmed for, deciding, for each drop of said plurality of drops, whether it is protected or not from perturbations due to the air resistance;
- means memorizing a first set of data or database (DB1) of charge data for drops protected from perturbations due to the air resistance and a second set of data or database (DB2) of charge data for drops not protected from perturbations due to the air resistance;
- means for, or means programmed for, selecting, for each drop of said plurality of drops, charge data from said first set of data or database (DB1) and/or from said second set of data (DB2);
- means for charging said drops according to the charges selected from said first set of data (DB1) or from said second set of data (DB2).

In a particular embodiment, a continuous inkjet printer according to the invention may comprise means for selecting a printing method among a dot matrix mode and a character mode; selecting said printing method among a dot matrix mode and a character mode may depend on the speed of a surface which must be printed, with respect to the continuous inkjet printer; alternatively an operator may also decide of the printing method among a dot matrix mode and a character mode.

A continuous inkjet printer according to the invention may comprise means for memorizing:

- a value of a minimum number of printed drops considered to be sufficient to protect the drops a plurality of following printed drops,
- and/or a maximum duration, or a maximum number of non-printed drops, beyond which there is no protection of one or more printed drops by a preceding printed drop or by a preceding plurality of printed drops.

A continuous inkjet printer according to the invention may comprise means for, or means programmed for, comparing:

- a number of printed drops with a minimum number of printed drops considered to be sufficient to protect the drops of a following drop or plurality of drops,
- and/or a duration, or a number of non-printed drops, between the generation of a preceding printed drop or of at last one of preceding plurality of printed drops and the generation of a first drop of at least one plurality of drops, with said maximum duration, or said maximum number of non-printed drops, beyond which there is no protection by the preceding printed drop or by the preceding plurality of printed drops.

A continuous inkjet printer according to the invention may memorize:

- a plurality of first sets of data, each of said first sets of data comprising charge data within a certain range of charge or of voltages, for drops protected from aerodynamic perturbations;
- and/or a plurality of second sets of data, each of said second sets of data comprising charge data for a certain range of charge or of voltages, for drops not protected from said perturbations.

A continuous inkjet printer according to the invention may comprise means for, or means programmed for, selecting the charge data from said at least first set of data or database (DB1) of charge data or said at least second set of data or database (DB2) of charge data one by one. Alternatively, said means for, or means programmed for, selecting the charge data allow a selection from said at least first set of data or database (DB1) of charge data or said at least second set of data or database (DB2) of charge data for a plurality of drops which are to be printed to form:

- a plurality of dots, for example part of a character or of a message;
- a plurality of dots, for example a whole character or a whole message.

A printer, or the controller of a printer, according to the invention or implemented in a method according to the invention comprises means for receiving an instruction to print a plurality of drops and selects the appropriate charge data of the drops according to the invention.

BRIEF DESCRIPTION OF THE DRAWINGS

FIG. 9 represents a printed message comprising three printed lines;

FIG. 10 represents a printed message comprising a first part printed over one line and a second part printed over three lines;

FIGS. 11A and 11B are comparative examples of printed letters, at slow speed (6 m/s, FIG. 11A), in a character mode and at a higher speed (12 m/s, FIG. 11B, in a character mode, in a non-protected mode (FIGS. 11A and 11B, upper part) and in a protected mode (FIGS. 11A and 11B, lower part);

FIG. 12A is a scheme of a printing head of a deviated continuous jet printer to which the present invention may be applied;

FIG. 12B represents the main units of an ink jet printer to which the present invention may be applied;

FIG. 13 represents a structure of an ink jet printer to which the present invention may be applied.

DETAILED DESCRIPTION OF EMBODIMENTS

A method according to an embodiment of the invention is first explained to determine whether the drops used for forming a printed character are protected or not from perturbations due to aerodynamic effects.

Figure 3:
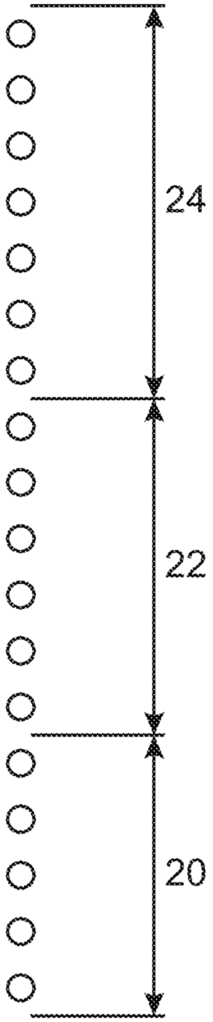
FIG. 3 represents a series of drops generated by a CIJ printer.

As illustrated on FIG. 3, successive drops or successive bursts or groups of drops 20, 22, 24 are generated by the drops generator of a CIJ printer. A group of drops 20 (printable drops) will form for example at least part of a first printed character (the "preceding character"), or a first part of a printed character, immediately followed by non-printed drops 22, which are immediately followed by another group of drops 24 (printable drops) will form for example at least part of a second printed character (the "next (or following) character" or the "new character") or a second part of the printed character.

The successive drops 20 (but not the drops 22 because they are not deviated) are able to protect drops 24 from aerodynamic perturbations if their number is higher than a predetermined minimum number ($N_{s,\ protec}$). Said minimum number can be experimentally estimated, by generating the drops 20, 22, 24, printing the drops 20 and 24, and deciding whether the series of printable drops 24 is skewed or has a regular shape; for example, if drops 20, resp. 24, belong, as explained above, to a preceding character, resp. a next character (resp. to a first part and a second part of a same character), by deciding whether the new character is skewed or has a regular shape (resp. if the second part of the character is skewed).

Said drops 20 may create some protection against aerodynamic perturbations for the drops 24 only during a certain time: they no longer protect drops 24 after a certain amount of time (maximum duration of protection) since the last one of the drops 20. Said maximum duration can be estimated or calculated: since the frequency generation of the drops is constant, said amount of time corresponds to a number of non-printed drops 22 ($N_{max,\ npd}$) which are generated during said amount of time; in other words, said drops 22 are those drops separating the two groups of drops 20, 24: they immediately follow the last one of the successive drops 20 and immediately precede the first one of drops 24.

The number of successive drops 20 to form for example at least part of a first printed character or a first part of a printed character, and preceding the succession of drops 24 can be counted or measured (Meas($N_{p,d}$)), for example by the controller of the CIJ printer. Said measured number of drops 20 can be compared with the predetermined minimum number ($N_{s,\ protec}$).

The number of non-printable drops 22 which follow the drops 20 and which precede the drops 24 can also be counted or measured (Meas($N_{np,d}$)). Said measured number of drops 22 can be compared with the predetermined maximum number ($N_{max,npd}$).

Based on the above comparisons, it can be decided whether drops 24 are protected or not from aerodynamic perturbations.

If said drops 24 are not protected from aerodynamic perturbations (this will be for example the case of drops not preceded by any other drop), their charge can be modified with respect to a situation where said drops are protected from aerodynamic perturbations.

For the above reasons, at least a first set of data, or a first database, (DB1) can be created, comprising, for each of the drops 20, 24 generated to form at least part(s) of each character, or part(s) of a character, the charges to be applied in a situation where said drops are protected from aerodynamic perturbations. To create this first set of data or database, the drops 24 can be generated and are preceded by a number of drops 20, the positions and the number of which can be varied to determine how the drops 24 can be protected from aerodynamic perturbations by drops 20. The charges to be applied to drops 24 to obtain a print of good quality can be identified or measured. This can be done for each character of a set of characters.

At least a second set of data, or a second database (DB2) can be created, comprising, for each of the drops 20, 24 generated to form at least part(s) of each character, or part(s) of a character, the charge to be applied in a situation where said character is not protected from aerodynamic perturbations. To create this second set of data or database, the drops 24 are generated without preceding drops 20, 22: thus, the drops 24 are perturbed by aerodynamic effects and the charges to be applied to them to obtain a print of good quality can be identified or measured. These charges (and also number of protection drops or guard drops) are different from the charges applied to the same drops 24 when they are protected.

In other words, depending on whether the drops are protected or not by preceding drops, for example drops used for printing a preceding character or part of the same character, the charges can be selected from the appropriate set of data or database.

Since the drops are usually charged by one or more charging electrode(s) 64 (FIG. 12A) the charges of the set of data or of the database can be identified by the corresponding voltages applied to said electrode(s) to create the charges which are needed.

To summarize, the number of preceding printable drops 20 ($N_{p,d}$) and the number of preceding non printable (and non printed) drops 20 ($N_{np,d}$) are counted or calculated. For any new group or burst of drops 24: $N_{p,d}$ and $N_{np,d}$ can be measured (they can be counted by the printer), thus giving the measured values meas($N_{p,d}$) and meas($N_{np,d}$).

If:

$$\text{meas}(N_{p,d}) \geq N_{s,protect}$$

and if:

$$\text{meas}(N_{np,d}) \leq N_{max,npd},$$

then the charges of the drops 24 are selected from the 1st set of data or database (DB1).

If one of the above conditions is not met: the charges of the drops 24 are selected from the 2nd set of data or database (DB2).

During a printing operation, the charges can be selected from one or the other of said sets of data or databases depending on whether one drop or the drops 24 of a plurality of generated drops are protected or not (said drops 24 being for forming for example a new character or part of a character).

Figure 4:
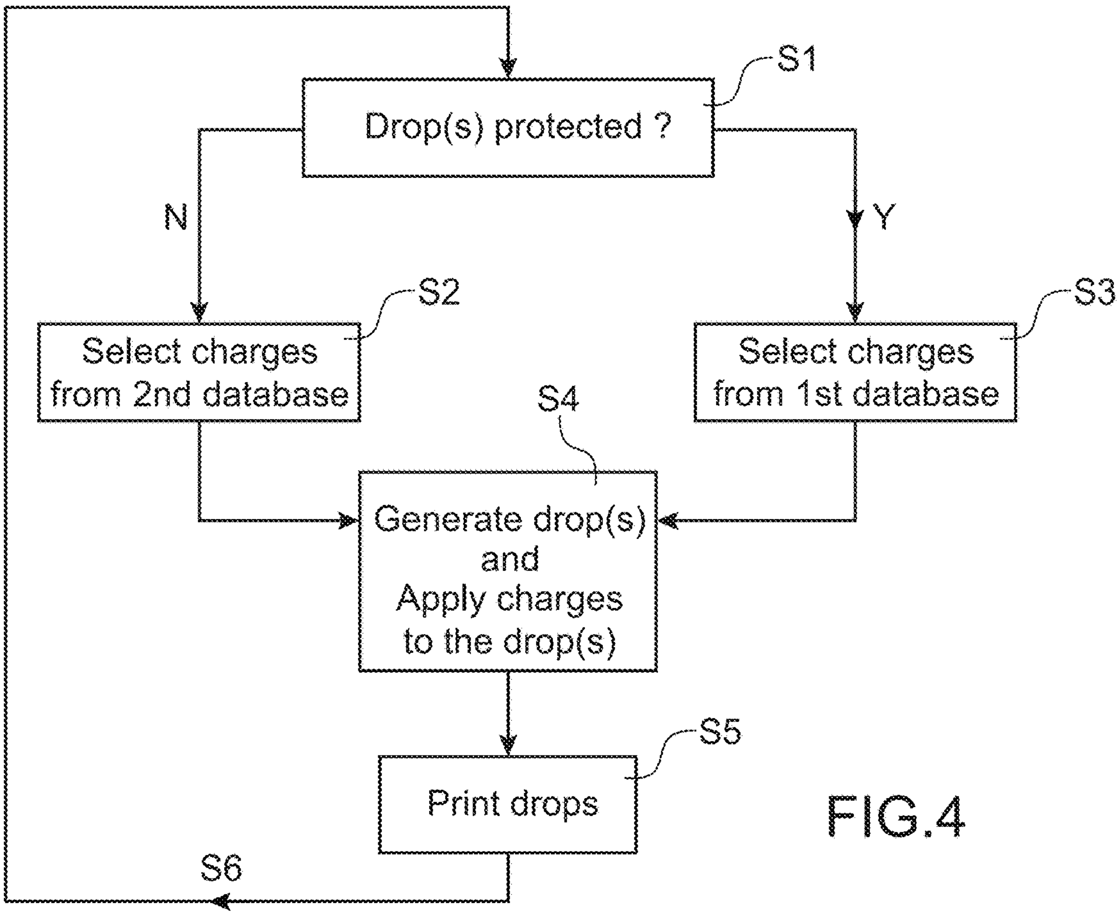
FIG. 4 represents steps of an example of a method according to the invention.

FIG. 4 summarizes the printing steps of a method according to the invention:

- First (step S1), it is determined whether the drop 24 or the drops 24 of said plurality of drops is/are protected or not;
- if the drop(s) 24 is/are protected, the charge(s) is/are selected from the 1st set of data or database (step S2);
- if the drop(s) 24 is/are not protected, the charge(s) is/are selected from the 2nd set of data or database (step S3);
- the drop(s) 24 is/are generated and charge(s) from the corresponding set of data or database are applied to said drop(s) 24 (step S4); it has to be noted that the drop(s) is/are generated and charged simultaneously as can be understood from FIG. 12A which shows that the drops separate from the ink jet at a time where they are in the charge electrode(s) 64;
- the drop(s) or the character is/are printed (step S5);
- the printing operation can continue with the next drop or plurality of drops, for example for the next character or for the same character (step S6).

A first plurality of drops which are non-protected and which are generated and charged for forming for example a character or a message, can be followed by a second plurality of drops which are protected and which are generated and charged for forming for example a character or the same message, the charge data for said first plurality of drops being selected from the 2nd set of data or database (DB2) and the charge data for said second plurality of drops being selected from the 1st set of data or database (DB1).

A first plurality of drops which are protected and which are generated and charged for forming for example a character or a message, can be followed by a second plurality of drops which are not protected and which are generated and charged for forming for example a character or the same message, the charge data for said first plurality of drops being selected from the 1st set of data or database (DB1) and the charge data for said second plurality of drops being selected from the 2nd set of data or database (DB2).

It is thus possible for the printer to switch from one of said sets of data or databases to the other in any order during printing, for example of a same message, or even during printing a same character or portion of character, depending on the protected or non-protected nature of the drops to be charged.

In a particular embodiment, $N_{s,\ protec}=1$: a single generated drop 20, or 1st drop, which forms a printed dot ("•") on the surface protects the drop(s) 24 which follow(s) said 1st drop.

In a more particular embodiment, the number of non-printed drops $Nn_{p,d}$) 22 which follow said protecting 1st drop 20 and which precede said drops 24, can be equal to zero: in this case, any blank character creates aerodynamic perturbations, and any drop following a blank character (or the absence of an immediately preceding drop) of a group of drops 24 immediately following said blank character must be charged with a charge from the 2nd set of data or database (DB2).

Another aspect of the invention, which can be or not combined with the above described first aspect, is now explained in connection with FIGS. 5A and 5B.

This aspect of the invention concerns a new printing mode, different than the above described dot matrix mode.

Figure 5A:
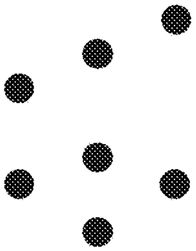
FIGS. 5A and 5B represent drops generated by a CIJ printer for printing a character in character mode.
Figure 5B:
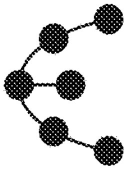

This other printing mode, a so-called "character" printing mode allows a reduction of the number of drops used for printing each character, see FIGS. 5A and 5B, FIG. 5A showing a group of drops generated by the generator of the printer according to this "character" printing mode: said drops are flying towards the support on which the character must be printed and FIG. 5B shows the printed drops.

In the "character" printing mode, the whole character is considered as a single row of drops and the charges of all printable drops of the whole character are calculated together for a good printing. No drop is generated which is not printed, except for some guard drops.

Figure 1A:
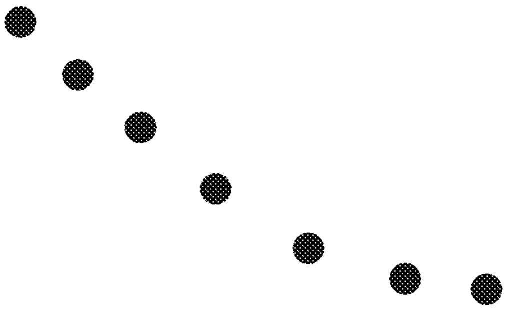
FIGS. 1A and 1B represent drops generated by a CIJ printer for printing a character in dot matrix mode.
Figure 1B:
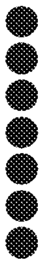
Figure 2:
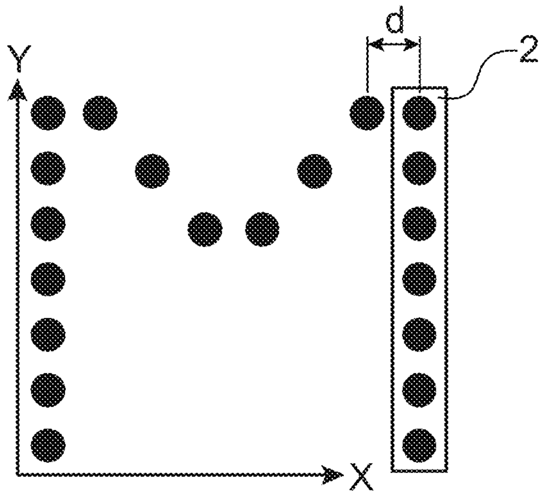
FIG. 2 represents a character printed in dot matrix mode.

In the "character" printing mode, a succession of drops is generated to print the whole character or, more generally, a group of pixels or drops which are aligned along different columns between a first printed column and a last printed column; in the dot matrix mode, presented above in connection with FIGS. 1A-2, successive bursts or groups of drops are generated or selected, charged and deviated, and the columns of the character are printed one after the other.

In other words, in the new "character" printing mode, all drops which are necessary to print the dots forming a character or the group of pixels or printed dots, said dots not being aligned along a same column or belonging to different columns are generated and charged each time the support moves forward of a certain predetermined distance or pitch. As already explained above, the printing substrate travels in a direction X and its position relative to the print head is detected by a detector or by means for detecting the said travel, said means emitting "strokes" (or position signals) at each step which are received by the controller of the printer. Thus the emission of all drops for printing a whole character or a group of dots which are not aligned along a line perpendicular to the direction X can be synchronized with a single step of the travel of the substrate.

In the new printing mode, the drops are preferably not printed in the order in which they appear in the printed character. In particular, it is possible to start printing a column before finishing the print of the preceding column. This gives the possibility to separate the drops with the highest charges in order to reduce electrostatic interactions between them. In an example, if the character has N columns i ($1 \leq i \leq N$), each column having $n_{ic}$ dots j ($1 \leq j \leq n_{ic}$), at least one or more dots of column i+1 can be printed before at least one dot of column i is printed, for example before the dot of column i printed with the drop having the largest charge of the drops used for printing column i is printed. Thus the drop used to print one dot of the column i and having the second largest charge among the drops used to print column i will less interact with the drop having the largest charge of the drops used for printing column i+1.

Figure 6A:
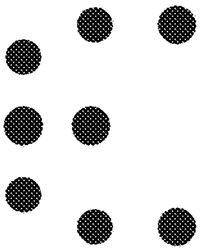
FIG. 6A represents a character printed according to a protected character mode.
Figure 6B:
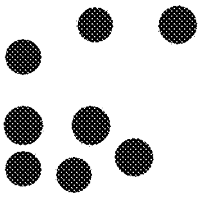
FIG. 6B represents a character printed according to a non-protected character mode.

FIG. 6B show how a character printed according to the "character" mode is skewed due to aerodynamic perturbations, FIG. 6A showing the same character with a regular shape.

Examples of generation of characters in dot-matrix and in character mode are now given in connection with FIGS. 7A-8C.

Figure 7A:
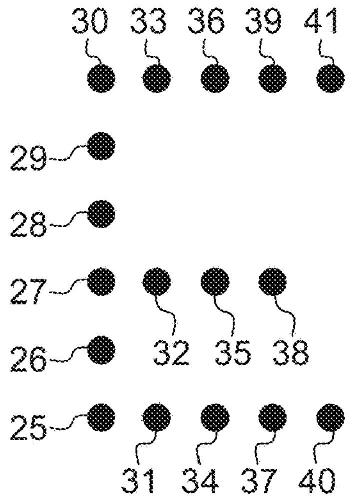
FIG. 7A represents a letter to be printed and FIGS. 7B and 7C give the charges to apply to the drops to print said letter in a dot matrix mode (FIG. 7B) and in a character mode (FIG. 7C)
Figure 8A:
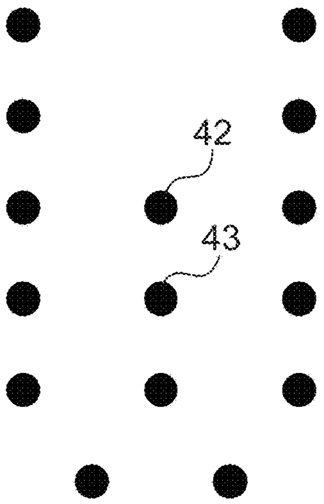
FIG. 8A represents a letter to be printed and FIGS. 8B and 8C give the charges to apply to the drops to print said letter in a dot matrix mode (FIG. 8B) and in a character mode (FIG. 8C)

Each of FIGS. 7A and 8A represents a letter which can be printed either in dot matrix mode or in character mode (the result being normally the same if the number of printed drops is the same in both modes for a same substrate speed).

Figure 7B:
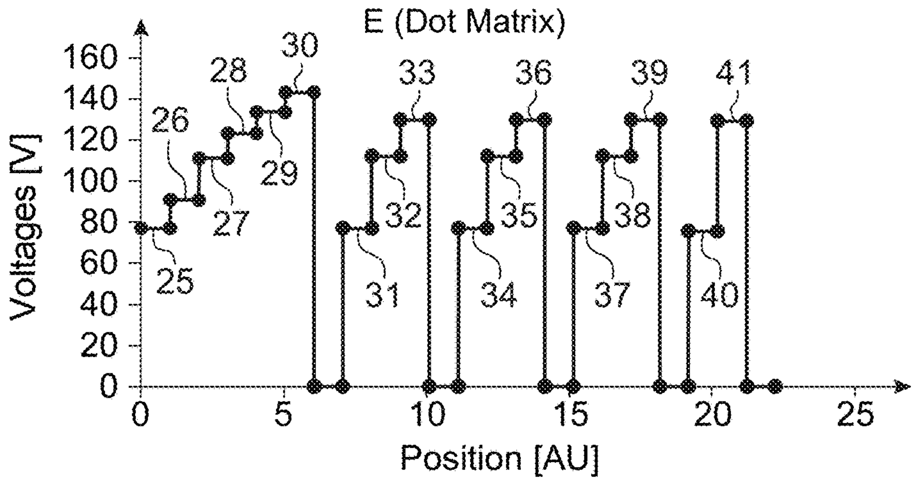
FIGS. 7D-7E represents a group of drops flying towards a surface on which the character of FIG. 7A must be printed in character mode, in a protected (FIG. 7D) and non-protected mode (FIG. 7E)
FIGS. 7F and 7G represent the letter "E" printed in dot matrix mode at a first speed and in character mode at a second speed higher than the first speed.
Figure 7C:
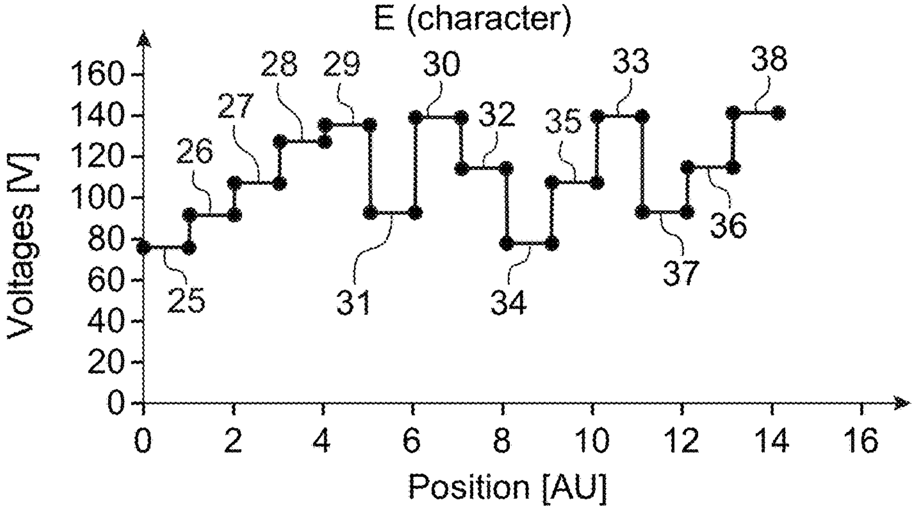

FIG. 7B gives the charges to be applied to the drops to print the letter "E" of FIG. 7A in a non-protected dot matrix mode, FIG. 7C gives the charges to be applied to the drops to print the same letter of FIG. 7A in the protected character mode (using only 14 drops). Each of the groups of drops for printing dots 25-30, 31-33, 34-36, 37-39, 40-41 and the following group of drops for printing dots 31-33, 34-36, 37-39, 40-41 are separated by a group of drops which are not charged and are not represented on FIG. 7A. These charges of FIG. 7B, resp. 7C, are entered in the set of data or database for printing the letter "E" of FIG. 7A in dot matrix mode, resp. in character mode.

One aspect of the character mode can be understood based on FIG. 7C: the several dots 25-30 of FIG. 7A are printed with drops which are charged as indicated on FIG. 7C; the last dot 30 of the first column of the E is not printed immediately after dot 29 is printed, but after the dot 31 is printed, so that drops with higher charges can be more efficiently separated (for example drop 30 is not printed just after drop 29, so that the drops used to print said two dots 29, 30 are separated by the drop used to print dot 31). For the same reasons, the last dot 33 (resp. 36, 38) of the second (resp. third, fourth) column of the E is not printed immediately after dot 32 (resp. 35) is printed, but after the dot 35 (resp. 37) is printed In other words, printing of a column can begin before printing of the preceding column is achieved. One can also see from FIG. 7C that the number of charged drops used for the character mode can be less than the number of charged drops of the dot matrix mode.

Figure 7D:
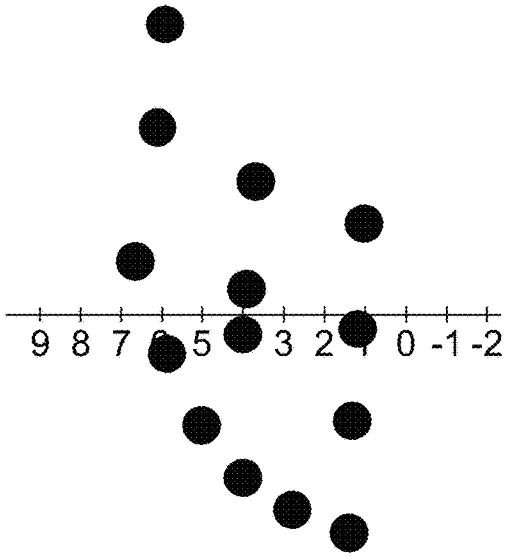
Figure 7E:
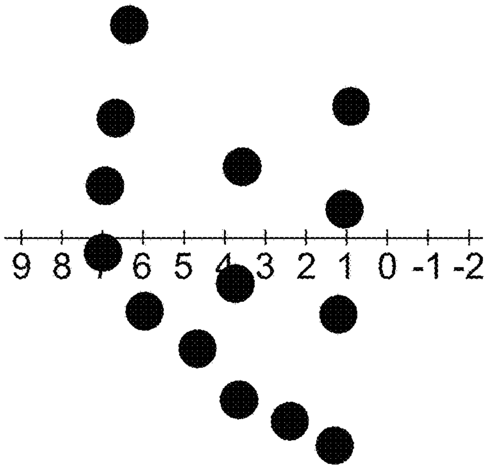

FIGS. 7D and 7E represent the drops used for printing the letter "E" of FIG. 7A in character mode during their flight, in protected mode (FIG. 7D) and in non-protected mode (FIG. 7E).

Figure 7F:
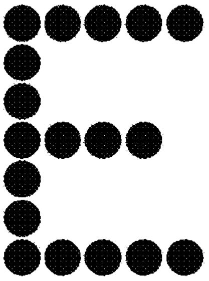
Figure 7G:
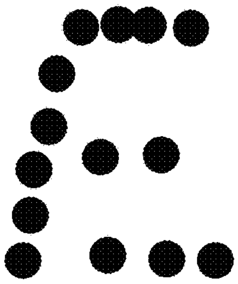

FIGS. 7F and 7G represent the letter "E" printed in non-protected dot matrix mode with 17 drops (FIG. 7F) at a first speed and in a protected character mode with 14 drops (FIG. 7G), at a second speed higher than the first speed.

Figure 8B:
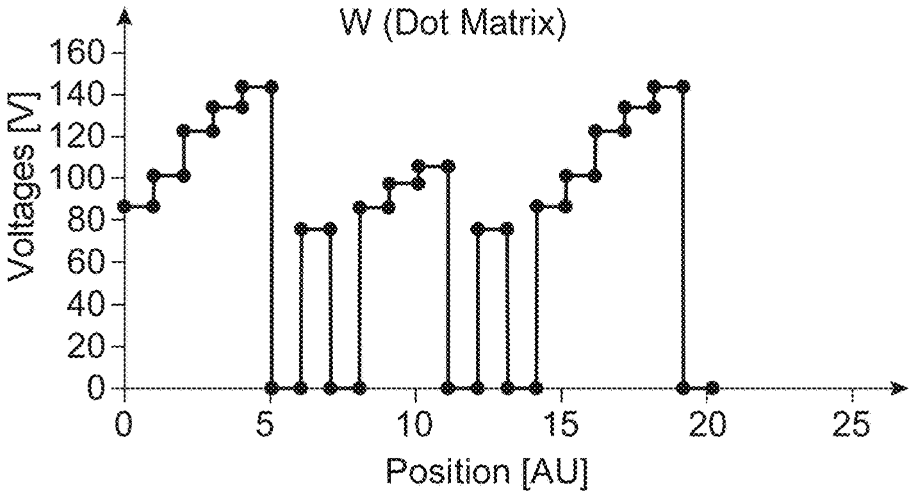
FIGS. 8D-8E represents a group of drops flying towards a surface on which the character of FIG. 8A must be printed in character mode, in a protected (FIG. 7D) and non-protected mode (FIG. 7E)
Figure 8C:
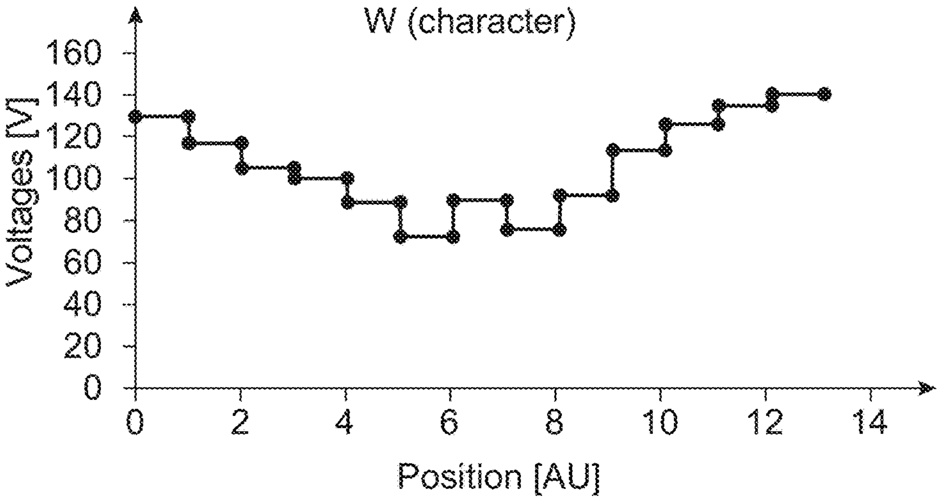

FIG. 8B gives the charges to be applied to the drops to print the letter of FIG. 8A in non-protected (the result being the same if the number of printed drops is the same in both modes) dot matrix mode, FIG. 8C gives the charges to be applied to the drops to print the letter "W" of FIG. 8A in a protected character mode (using only 13 drops, the dots 33, 34 of FIG. 8A not being printed). These charges of FIG. 8B, resp. 8C, are entered in the set of data or database for printing the letter "W" of FIG. 8A in dot matrix mode, resp. in character mode.

One can see from FIG. 8C that the number of charged drops used for the character mode can be less than the number of charged drops of the dot matrix mode.

Figure 8D:
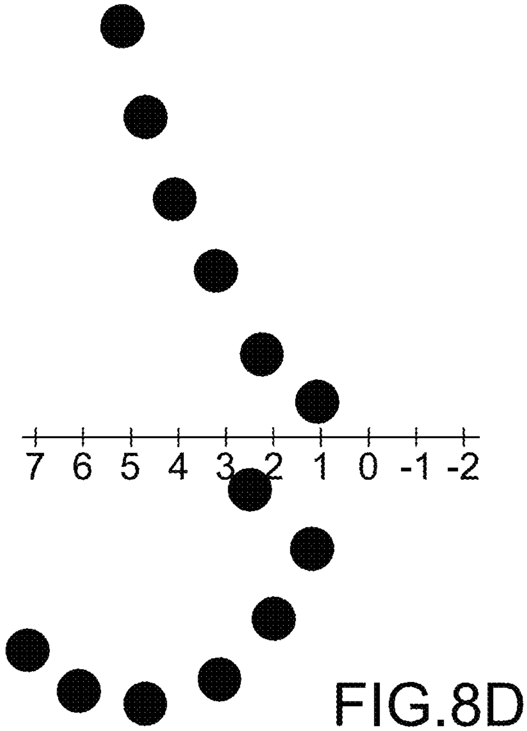
Figure 8E:
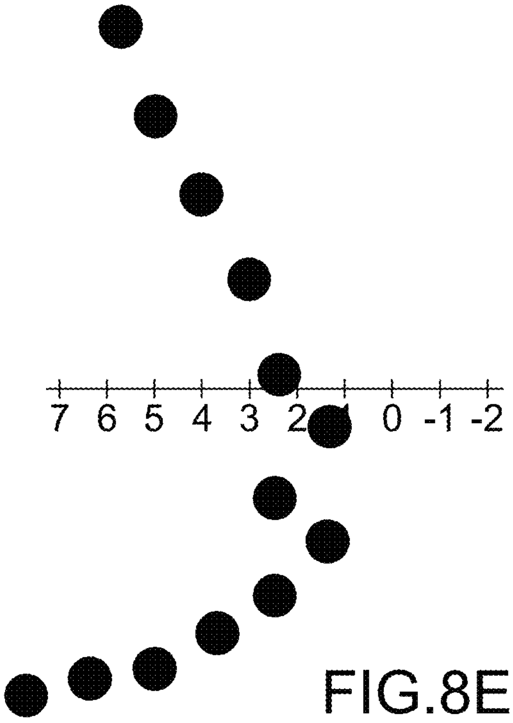

FIGS. 8D and 8E represent the drops used for printing the letter "W" of FIG. 8A in character mode during their flight, in protected mode (FIG. 8D) and in non-protected mode (FIG. 8E).

As is clear from FIGS. 7D, 7E, 8D, 8E, the single group of drops used to print the whole of the character in character mode does not have the same aspect as the successive groups of drops generated, charged and deviated in the dot matrix mode, in which the columns of the character are printed one after the other.

Guard drops are not represented on any of FIGS. 7B-7E, 8B-8E and non-printed drops are not represented on any of FIGS. 7B and 8B. But the number of drops generated for printing a character in character mode is less than for printing a character in dot-matrix mode.

Charges can be calculated or evaluated or measured for any letter (in any known alphabet) or any character (numbers, figures etc) or graphical symbol (for example: &, %, µ, etc) for both the character mode and the dot-matrix mode. These charges are entered into the corresponding set of data or database for printing the letter or character or symbol concerned.

The charge data applied to the protected drops and the charge data applied to the non-protected drops may depend on the charge range: drops which have a higher charge also have a longer flight time before being printed on the surface and are thus subject to more perturbations, in particular aerodynamic perturbations. For this reason, it is preferable, in cases where several charge ranges are involved, to have different sets of data, or databases, for protected drops for each charge range and different sets of data, or databases, for non-protected drops for each charge range. This is in particular the case when several lines, preferably parallel to each other, are printed from a same origin (identified by axis Y on FIG. 9, axis Y being perpendicular to axis X of travel of the printing substrate).

Examples of printing such several lines of characters is explained in connection with FIG. 9, which represents a message comprising three parallel lines 30, 31, 32 which have a same Y origin identified along axis X:

- the drops of the first line 30 are printed with charge voltages comprised between 30 and 70 volts (charges are generated by the action of the electrodes 64, hence the reference to Volts);
- the drops of the second line 31 are printed with charge voltages comprised between 80 and 120 volts;
- the drops of the third line 32 are printed with charge voltages comprised between 130 and 160 volts.

In this example, and in the more general case of several juxtaposed parallel lines having a same origin along the axis X of travel, the columns of the different lines which are located in a same position $X_1$ are printed successively, before printing the columns of the different lines located at $X_2$; in other words, for N parallel lines (having as explained above, a same origin along axis X), the first columns of all N lines are first printed, then the $2^{nd}$ columns of all N lines, . . . , and the $i^{th}$ columns of all N lines ($1 \leq i < N$) are printed before the $(i+1)^{th}$ columns of all N lines.

Due to the different charge ranges, different sets of data or databases are generated:

- a first set of data or database (DB11) of charge data for drops of the first line 30 protected from aerodynamic perturbations and a second set of data or database (DB12) of charge data for drops of the first line not protected from said aerodynamic perturbations;
- a first set of data or database (DB21) of charge data for drops of the second line 31 protected from aerodynamic perturbations and a second set of data or database (DB22) of charge data for drops of the second line not protected from said aerodynamic perturbations;

a first set of data or database (DB31) of charge data for drops of the third line 32 protected from aerodynamic perturbations and a third set of data or database (DB32) of charge data for drops of the third line not protected from said aerodynamic perturbations.

Printing begins for example with the first left-hand part of all three lines.

The left-hand part of the letter "P" of the first line is not protected from aerodynamic perturbations, hence the charges of the drops for printing this part are selected from the second set of data or database (DB12) for the first line.

The left hand part of the letter "F" of the third line is not protected from aerodynamic perturbations, hence the charges of the drops for printing this part are selected from the second set of data or database (DB32) for the third line.

The left hand part of the letter "N" of the first line is not protected from aerodynamic perturbations (because of the insufficient number of the drops for printing of the right hand part of the first "L" of the third line), hence the charges of the drops for printing this part are selected from the second set of data or database (DB11) for the first line.

The left hand part of the second letter "L" of the third line is not protected from aerodynamic perturbations, hence the charges of the drops for printing this part are selected from the second set of data or database (DB32) for the third line.

A similar reasoning can be carried out for other parts of the message illustrated on FIG. 9.

Drops for printing different parts of a same character may require charges from different sets of data or databases, drops for some parts of said character being protected from aerodynamic perturbations, while drops for some others parts of the same character are not.

An example of generation of such character is explained in connection with FIG. 10.

The printed message extends over 3 lines 30', 31', 32'; a part of the message ("w25478") is printed on the middle line 32' only and a tall character "R" extends over the 3 lines.

The left-hand part of the first line of the letter R is not protected from aerodynamic perturbations, hence the charges of the drops for printing this part are selected from the second set of data or database (DB12) for the first line.

The left-hand part of the middle portion of this "R" character (on line 31') is protected by the drops used to print the left hand part of the "R", on line 30'. The charges of the drops for printing this middle part of the "R" are selected from the first set of data or database (DB21) for the second line.

The left hand part of the third line of the letter "R" is protected from aerodynamic perturbations by the drops used to print the right hand part of the second line of the "R", hence the charges of the drops for printing this part are selected from the first set of data or database (DB32) for the third line.

Examples of printed letters are given on FIGS. 11A and 11B.

The letters of FIG. 11A are printed at slow speed, in the character mode (6 m/s) in a non-protected mode (upper part) and in a protected mode (lower part).

The letters of FIG. 11B are printed at higher speed, in the character mode (12 m/s) in a non-protected mode (upper part) and in a protected mode (lower part).

In both cases, the print quality is much better in the protected mode than in the non-protected mode.

The above description applies both to the dot matrix printing mode and to the character printing mode and/or to printing operations at slower speeds (<5 m/s or <10 m/s).

Upon starting a printer, the speed can be increased from 0 to a slow speed (for example <5 m/s or <10 m/s) and then to a higher speed (for example >5 m/s or >10 m/s or even comprised between 15 m/s and 20 m/s) and the printing mode can be varied from a dot matrix mode (at slow speed) to a character mode (at higher speed).

A printer implementing the above described invention is illustrated on FIGS. 12A-12B.

In multi-deflected continuous jet printers, each drop of a single jet (or spaced apart from a few jets) can be deflected on various trajectories corresponding to different commands. A succession of drops undergoing different commands can thus scan the zone to be printed along a direction which is the deflection direction, the other scanning direction of the zone to be printed resulting from a relative movement of the printing head and the support to be printed 800 (see FIG. 12A). Generally, the elements are arranged such that these 2 directions are substantially perpendicular.

The deviated continuous ink jet printing heads have different operating sub-assemblies. FIG. 12A illustrates in particular a printing head of a multi-deflected CIJ printer. It comprises:

means 21, 23 for generating a drop jet called drop generator or stimulation body;

means 64 (usually one or more electrodes) for charging the drops;

means 62 (or "gutter") for recovering ink not used for printing;

means 65 (usually one or more electrodes) for deflecting the charged drops for printing;

possibly means for monitoring and controlling the drop deflection process (synchronisation of drop formation with deflection commands).

In the drop generator 21 a cavity is supplied with an electrically conductive ink. This ink, held under pressure, by an ink circuit 27, generally external to the head, escapes from the cavity through at least one gauge nozzle 6 thus forming at least one ink jet 11.

A periodical stimulation device 23 is associated with the cavity in contact with the ink upstream of the nozzle 6; it transmits to the ink a (pressure) periodical modulation which causes a modulation of velocity and jet radius from the nozzle. When the dimensioning of the elements is suitable, this modulation is amplified in the jet under the effect of surface tension forces responsible for the capillary instability of the jet, up to the jet rupture. This rupture is periodical and is produced at an accurate distance from the nozzle at a so-called «break» point 13 from the jet, which distance depends on the stimulation energy.

In the case where a stimulation device, called an actuator, comprises a piezoelectric ceramics in contact with the ink of the cavity upstream of the nozzle, the stimulation energy is directly related to the amplitude of the electrical signal for driving the ceramics. Other jet stimulation means (thermal, electro-hydrodynamic, acoustic, . . . ), can also be implemented in the frame of this invention. The stimulation using piezoelectric ceramics remains the preferred embodiment due to its efficiency and relative workability.

At its breaking point 13, the jet, which was continuous from the nozzle, is transformed into a train 11 of identical and evenly spaced apart ink drops. The drops are formed at a time frequency identical to the frequency of the stimulation signal; for a giving stimulation energy, any other parameter being otherwise stabilized (in particular ink viscosity), there is an accurate (constant) phase relationship between the periodical stimulation signal and the breaking instant, itself periodical and with a same frequency as the stimulation signal. In other words, to an accurate instant of the period of the stimulation signal corresponds an accurate instant in the separation dynamic of the jet drop.

Without further action (this is the case where drops are not used for printing), the drop train travels along a trajectory 7 collinear to the drop ejection axis (nominal trajectory of the jet) which joins, by a geometric construction of the printing head, the recovery gutter 62. This gutter 62 for recovering non-printed drops uptakes the ink not used which comes back to the ink circuit 27 to be recycled.

For printing, the drops are deflected and deviated from the nominal trajectory 7 of the jet. Consequently, they follow oblique trajectories 9 which meet the support to be printed 800 at different desired impact points. All these trajectories are in a same plane. The placement of the drops on the matrix of impacts of drops to be printed on the support, to form characters, for example, is achieved by combining an individual deflection of drops in the head deflection plane with the relative movement between the head and the support to be printed (generally perpendicular to the deflection plane). In the deviated continuous jet printing technology, the deflection is achieved by electrically charging drops and by passing them into an electric field. In practice, the means for deflecting drops comprise at least one charging electrode 64 for each jet, located in the vicinity of the break point 13 of the jet. It is intended to selectively charge each drop formed at a predetermined electrical charge value which is generally different from one drop to the other. To do this, the ink being held at a fixed potential in the drop generator 21, a voltage slot with a determined value, driven by the control signal, is applied to the charging electrode 64, this value being different at each drop period.

In the control signal of the charging electrode, the voltage application instant is shortly before the jet fractionation to take advantage of the jet electrical continuity and attract a given charge amount, which is a function of the voltage value, at the jet tip. This variable charge voltage affording the deflection is typically between 0 and 300 Volts. The voltage is then held during the fractionation to stabilize the charge until the detached drop is electrically insulated. The voltage remains applied for a certain time after the drop is detached to take break instant issues into account.

The drop deflecting means usually comprise a set of 2 deflection plates 65, located on either side of the drop trajectory upstream of the charging electrode. Both these plates are put to a high fixed relative potential producing an electrical field Ed substantially perpendicular to the drop trajectory, capable of deflecting the electrically charged drops which are engaged between the plates. The deflection amplitude is a function of the charge, the mass and the velocity of these drops.

A CIJ printhead may also comprise several ink-jet cavities for generating several ink jets, each cavity having its own nozzle and activation means or a same cavity may comprise several nozzles to produce several ink-jets. Charging electrodes and deviation electrodes can be associated with each jet as explained above.

The instructions for activating the means 21, 23 for producing ink jets and/or for activating the pumping means, for example of the gutter, and/or for opening and closing of valves in the path of the different fluids (ink, solvent, gas) may be sent by control means (also called "controller"). It is also these instructions that can make it possible to make ink circulate under pressure in the direction of the means 21, 23 then to generate jets as a function of the patterns to be printed on a support 800. These control means are for example realised in the form of a processor or a microprocessor, or of an electrical or electronic circuit, programmed to, or implementing a software designed to, implement a method according to the invention. The control means may also assure the memorisation of data, for example measurement data of ink levels in one or more reservoirs, and their potential processing.

The control means may also memorize the data of at least a first set of data or database (DB1) and at least a second set of data or database (DB2) in order to implement a method according to the invention, in dot matrix mode or in character mode. More precisely, said sets of data or databases can be memorized in one or more memory, for example a FPGA, the data being read by the above mentioned processor or microprocessor or electronic circuit. The control means also control the voltage applied to the charge electrode(s) and/or to the deviation electrode(s).

FIG. 12B represents the main units of an ink jet printer that can implement one or more of the embodiments of the present invention. The printer comprises a console 300, a compartment (or fluidic circuit) 400 containing notably the circuits for conditioning the ink and solvents, as well as reservoirs for the ink and the solvents (in particular, the reservoir to which the ink recovered by the gutter is bought back). Generally, the compartment 400 is in the lower part of the console. The upper part of the console comprises the command and control electronics as well as visualisation means. The console is hydraulically and electrically connected to a print head 100 by an umbilical 203.

A gantry, not represented, makes it possible to install the print head facing a printing support 800, which moves along a direction materialised by an arrow. This direction is perpendicular for example to an axis of alignment of the nozzles or to an axis of deviation of the drops (see deviated jet 9 on FIG. 12A). The support moves along direction X. The position of the support with respect to the print head is detected by a detector 401.

Such a printer can be integrated into a packaging machine.

Printers according to the invention are industrial printers, for example which have the ability to print on surfaces which are not flat, for example cables or bottles or cans. Another aspect of such printers is that the distance between the printing head and the substrate which must be printed is higher than in conventional desk printers. For example that distance is at least 5 mm, for example between 10 mm and 30 mm.

Another aspect of such printers is their speed: their maximum speed is between up to 15-20 m/s, the usual 'nominal) printing speed being between 1-5 m/s.

Another aspect of such printers is that they can print on very different surfaces, for example glass, or metal or blisters or packaging materials.

An example of fluidic circuit 400 of a CIJ printer to implement the invention is illustrated in FIG. 13. This fluidic circuit 400 comprises a plurality of means 410, 500, 110, 220, 310, each associated with a specific functionality. The head 1 and the umbilical 203 are also illustrated.

With this circuit 400 are associated a removable ink cartridge 130 and a solvent cartridge 140, also removable.

The reference 410 designates the main reservoir, which makes it possible to receive a mixture of solvent and ink.

The reference 110 designates the set of means that make it possible to withdraw, and potentially to store, solvent from a solvent cartridge 140 and to provide the solvent thereby withdrawn to other parts of the printer, whether it involves supplying the main reservoir 410 with solvent, or cleaning or maintaining one or more of the other parts of the machine.

The reference 310 designates the set of means that make it possible to withdraw ink from an ink cartridge 130 and to provide the ink thereby withdrawn to supply the main reservoir 410. As may be seen in this figure, according to the embodiment presented here, the sending, to the main reservoir 410 and from the means 110, of solvent, goes through these same means 310.

At the outlet of the reservoir 410, a set of means, globally designated by the reference 220, makes it possible to pressurise the ink withdrawn from the main reservoir, and to send it to the print head 1. According to an embodiment, illustrated here by the arrow 250, it is also possible, by these means 220, to send ink to the means 310, then again to the reservoir 410, which enables a recirculation of ink inside the circuit. This circuit 220 also makes it possible to empty the reservoir in the cartridge 130 as well as to clean the connectors of the cartridge 130.

The CIJ system represented in this figure also comprises means 500 for recovering fluids (ink and/or solvent) that return from the print head, more exactly from the gutter 62 of the print head or the rinsing circuit of the head. These means 500 are thus arranged downstream of the umbilical 203 (with respect to the sense of circulation of the fluids that return from the print head).

As may be seen in FIG. 13, the means 110 may also make it possible to send solvent directly to these means 500, without going either through the umbilical 203 or through the print head 1 or through the recovery gutter.

The means 110 may comprise at least 3 parallel solvent supplies, one to the head 1, the $2^{nd}$ to the means 500 and the $3^{rd}$ to the means 310.

Each of the means described above is provided with means, such as valves, preferably electromagnetic valves, which make it possible to orient the fluid concerned to the chosen destination. Thus, from the means 110, it is possible to send the solvent exclusively to the head 1, or to the means 500 or to the means 310.

Each of the means 500, 110, 210, 310 described above may be provided with a pump which makes it possible to treat the fluid concerned (respectively: $1^{st}$ pump, $2^{nd}$ pump, $3^{rd}$ pump, $4^{th}$ pump). These different pumps assure different functions (those of their respective means) and are thus different to each other, even if these different pumps may be of the same type or of similar types (in other words: none of these pumps assures 2 of these functions).

In particular, the means 500 comprise a pump ($1^{st}$ pump) that makes it possible to pump fluid, recovered, as explained above, from the print head, and to send it to the main reservoir 410. This pump is dedicated to the recovery of fluid coming from the print head and is physically different to the $4^{th}$ pumping means 310 dedicated to the transfer of ink or the $3^{rd}$ pumping means 210 dedicated to the pressurisation of ink at the outlet of the reservoir 410.

The means 110 comprise a pump (the $2^{nd}$ pump) that makes it possible to pump solvent and to send it to the means 500 and/or to the means 310 and/or to the print head 1.

Such a circuit 400 is controlled by the control means described above, these means are in general contained within the console 300 (FIG. 12B).

The invention is advantageously applied to printing characters on surfaces of products having a curvature, for example the surface of a cable or a bottle or a can or of a duct or a tube or a pipe and/or products which are produced at high speed (which is notably the case for extruded products like cables or ducts or tubes or pipes).

The invention claimed is:

1. A method for forming at least one plurality of printed dots on a surface, with help of at least one plurality of drops generated by a printhead of a continuous inkjet printer comprising a drop generator, said method comprising, for each plurality of printed dots:

a) deciding, whether all drops of said at least one plurality of drops are protected from perturbations or whether at least one drop of said at least one plurality of drops is not protected from said perturbations, said deciding being based on whether said at least one plurality of drops is preceded by at least another drop to be printed or by a preceding plurality of drops to be printed from the same drop generator; said step a) being followed by:

a1) for each drop of said at least one plurality of drops, selecting charge data from at least a first set of data (DB1) of charge data for drops protected from said perturbations by preceding drops originating from the same drop generator or from at least a second set of data (DB2) of charge data for drops not protected from said perturbations by an absence of preceding drops originating from the same drop generator, depending on the result of step a);

b) generating and charging each drop of said at least one plurality of drops according to whether it is protected from said perturbations or not protected from said perturbations;

said step b) comprising generating and charging each drop of said at least one plurality of drops according to the charges selected from first set of data (DB1) or from said second set of data (DB2);

c) printing said at least one plurality of drops on said surface.

2. The method according to claim 1, wherein said charge data are selected from among at least one of:

a plurality of first sets of data, each of said first sets of data comprising charge data within a certain range of charge or of voltages, for drops protected from said perturbations; and a plurality of second sets of data, each of said second sets of data comprising charge data within a certain range of charge or of voltages, for drops not protected from said perturbations.

3. The method according to claim 1, wherein each of said sets of data forms a database.

4. The method according to claim 1, wherein said plurality of printed dots comprise several lines of printed dots, different lines being printed with different charge ranges.

5. The method according to claim 1, wherein said plurality of drops are charged and printed according to a dot matrix mode or according to a character mode.

6. The method according to claim 1, wherein, if said step of deciding whether all drops of said at least one plurality of drops are protected from perturbations or whether at least one drop of said at least one plurality of drops is not protected from said perturbations determines that said at least one plurality of drops is preceded by one preceding printed drop from the same drop generator, then said step of deciding is further based on the duration, or on the number of non-printed drops, between the generation of said one preceding printed drop from the same drop generator and the generation of the first drop of said at least one plurality of drops.

7. The method according to claim 6, wherein, if said step of deciding whether all drops of said at least one plurality of drops are protected from perturbations or whether at least one drop of said at least one plurality of drops is not protected from said perturbations determines that said at least one plurality of drops is preceded by a plurality of printed drop from the same drop generator, then said step of deciding is further based:

on the number of said preceding plurality of printed drop from the same drop generator; and on the duration, or on the number of non-printed drops, between the generation of the last one of said preceding plurality of printed drops and the generation of the first drop of said at least one plurality of drops.

8. The method according to claim 6, wherein said step of deciding whether all drops of said at least one plurality of drops are protected from perturbations or whether at least one drop of said at least one plurality of drops is not protected from said perturbations is based on at least one of:

the comparison of the number of preceding plurality of printed drops with a minimum number of printed drops considered to be sufficient to protect the drops of said at least one plurality of drops, and the comparison of said duration, or of said number of non-printed drops, between the generation of the preceding printed drop or of the last one of preceding plurality of printed drops and the generation of the first drop of said at least one plurality of drops, with a maximum duration, or a maximum number of non-printed drops, beyond which there is no protection by the preceding printed drop or by the preceding plurality of printed drops.

9. The method according to claim 1, wherein the surface on which the dots are printed has a curvature, for example the surface of a cable or a bottle or a can or of a duct or a tube or a pipe.

10. The method according to claim 1, wherein the surface on which the dots are printed has a speed higher than 5 m/s or higher than 10 m/s with respect to the continuous inkjet printer.

11. A continuous inkjet printer comprising:

a drop generator for forming a plurality of ink drops from a continuous jet of ink;

a controller for deciding, for each drop of said plurality of drops, whether it is protected or not from perturbations, said deciding being based on whether said at least one plurality of drops is preceded by at least another drop to be printed from the same drop generator or by a preceding plurality of drops to be printed from the same drop generator;

at least one electrode for charging said drops according to whether it is protected from said perturbations or not protected from said perturbations; and a memory memorizing a first set of data or database (DB1) of charge data for drops protected from perturbations by preceding drops originating from the same drop generator and a second set of data or database (DB2) of charge data for drops not protected from perturbations by an absence of preceding drops originating from the same drop generator;

said controller selecting, for each drop of said plurality of drops, charge data from said first set of data or database (DB1) and/or from said second set of data (DB2);

said at least one electrode charging said drops according to the charges selected from said first set of data (DB1) and/or from said second set of data (DB2) according to whether it is protected from said perturbations or not protected from said perturbations.

12. The continuous inkjet printer according to claim 11, wherein said controller selects charge data from among at least one of:

a plurality of first sets of data, each of said first sets of data comprising charge data within a certain range of charge or of voltages, for drops protected from said perturbations; and a plurality of second sets of data, each of said second sets of data comprising charge data within a certain range of charge or of voltages, for drops not protected from said perturbations.

13. The continuous inkjet printer according to claim 12, wherein each of said sets of data forms a database.

14. The continuous inkjet printer according to claim 11, wherein said controller selects a printing method among a dot matrix mode and a character mode.

15. The continuous inkjet printer according to claim 11, wherein said controller is configured to decide whether each drop is protected or not from perturbations based:

if said at least one plurality of drops is preceded by one preceding printed drop, on the duration, or on the number of non-printed drops, between the generation of said one preceding printed drop and the generation of the first drop of said at least one plurality of drops;

or, if said at least one plurality of drops is preceded by a plurality of printed drop:

on the number of said preceding plurality of printed drop:

and on the duration, or on the number of non-printed drops, between the generation of the last one of said preceding plurality of printed drop and the generation of the first drop of said at least one plurality of drops.

16. The continuous inkjet printer according claim 11, wherein said controller is configured to decide whether each drop is protected or not from perturbations based on at least one of:

the comparison of a number of preceding plurality of printed with a minimum number of printed drops considered to be sufficient to protect the drops of said at least one plurality of drops, and the comparison of a duration, or of said number of non-printed drops, between the generation of a preceding printed drop or of the last one of preceding plurality of printed drops and the generation of the first drop of said at least one plurality of drops, with a maximum duration, or a maximum number of non-printed drops, beyond which there is no protection by the preceding printed drop or by the preceding plurality of printed drops.

* * * * *